United States Patent

Sakaguchi et al.

Patent Number: 6,096,432
Date of Patent: *Aug. 1, 2000

[54] GLAZING LAYER-FORMING COMPOSITION FOR HOT-COATING OF FURNACE REFRACTORIES AND METHOD OF FORMING GLAZING LAYER

[75] Inventors: Seiichi Sakaguchi; Mitsutoshi Murase, both of Osaka, Japan

[73] Assignee: Asahi Chemical Company, Limited, Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/737,637

[22] PCT Filed: May 16, 1995

[86] PCT No.: PCT/JP95/00931

§ 371 Date: Nov. 15, 1996

§ 102(e) Date: Nov. 15, 1996

[87] PCT Pub. No.: WO95/31418

PCT Pub. Date: Nov. 23, 1995

[30] Foreign Application Priority Data

May 17, 1994 [JP] Japan .................................. 6-103076

[51] Int. Cl.⁷ .............................. B05D 7/22; C03C 3/076; B32B 9/04
[52] U.S. Cl. .......................... 428/428; 428/432; 428/701; 427/230; 427/397.8; 501/55; 501/65
[58] Field of Search ...................... 427/230, 397.8; 501/65, 55; 428/428, 432, 454, 701

[56] References Cited

U.S. PATENT DOCUMENTS

| | | | |
|---|---|---|---|
| 3,976,474 | 8/1976 | Wunder et al. | 501/65 |
| 4,303,446 | 12/1981 | LaCourse | 501/65 |
| 4,933,307 | 6/1990 | Marshall et al. | 501/55 |
| 5,059,561 | 10/1991 | Ciolek et al. | 501/55 |
| 5,077,240 | 12/1991 | Hayden | 501/55 |

FOREIGN PATENT DOCUMENTS

| | | |
|---|---|---|
| 0708069 | 4/1996 | European Pat. Off. |
| 1431951 | 6/1966 | France . |
| 4216934 | 11/1993 | Germany . |
| 49/73407 | 7/1974 | Japan . |
| 62/19477 | 10/1980 | Japan . |
| 63/40463 | 4/1984 | Japan . |
| 59/174585 | 10/1984 | Japan . |
| 61/286284 | 12/1986 | Japan . |
| 62/197371 | 9/1987 | Japan . |
| 62/48797 | 10/1987 | Japan . |
| 63/38886 | 2/1988 | Japan . |
| 63/72786 | 2/1988 | Japan . |
| 63/236783 | 10/1988 | Japan . |
| 1/14272 | 3/1989 | Japan . |
| 3/47893 | 2/1991 | Japan . |
| 6/346056 | 12/1994 | Japan . |

OTHER PUBLICATIONS

Encyclopedia Chimica 3, Sep. 30, 1960, pp. 308–309, Kyoritsu Shuppan Kabushiki Kaisha.

Glass Engineering, Nov. 5, 1958, pp. 46–57, Kyoritsu Shuppan Kabushiki Kaisha.

Sodium Silicate, Potassium Silicate, pp. 2–15, Nippon Kagaku Kogyo Kabushiki Kaisha.

*Primary Examiner*—Janyce Bell
*Attorney, Agent, or Firm*—Dilworth & Barrese

[57] ABSTRACT

Growth of scale on the wall surfaces of high-temperature furnaces is prevented, or the damaged portions are repaired. In addition, the inner wall surfaces of furnaces such as coke furnaces and carbon-firing furnaces, and attachments to furnaces (furnace lids and gas pipes) are protected from deposition of carbon.

Glazing layers are formed by application to the refractory surfaces of furnaces of a glazing agent which comprises as a glaze, on an oxide basis, 0–10% by weight of $Li_2O$, 0–10% by weight of $B_2O_3$, 10–40% by weight of $R_2O$ (R represents Na or K) and $SiO_2$ as the balance, wherein the glaze has a melting point of 900° C. or below.

17 Claims, No Drawings

“GLAZING LAYER-FORMING COMPOSITION FOR HOT-COATING OF FURNACE REFRACTORIES AND METHOD OF FORMING GLAZING LAYER”

TECHNICAL FIELD

The present invention relates to a glazing composition which is applied by hot-coating to such portions as bricks, monolithic refractories and joints which construct the wall surfaces of high-temperature furnaces to form glazing layers on surfaces thereof, glazing layers for protecting the wall surfaces, and a method of forming glazing layers on the inner wall surfaces of such furnaces.

Particularly, the present invention relates to a method of preventing the deposition of carbon such as tar, which is produced when coal is carbonized or carbon is fired, on the inner wall surfaces of such furnaces as coke furnaces or carbon-firing furnaces.

BACKGROUND ART

High-temperature furnaces are used for a variety of industrial applications, however, troubles occur, such as the formation of scale or damage over a prolonged period of use, since the reaction products produced in the furnaces or dust are deposited therein. This necessitates coating the refractory surfaces of the furnaces with dense layers, or repairing the damaged portions by implantation of refractory materials.

When the furnaces are small, the furnaces may be stopped to take necessary measures without causing particular problems, whereas large furnaces which are often operated continuously for a long period usually undergo such measures while hot, without being cooled.

The methods of coating the refractory surfaces of furnaces while hot include spraying of monolithic refractories, plasma- or arc flame spraying, etc. The former method, though relatively inexpensive to perform, has drawbacks in that dense coating layers are difficult to form, and the coating layers are not sufficiently strong to withstand peel-off. On the other hand, the latter method has the economic drawback of high cost to perform, though relatively strong films may be formed.

A special example of the scaling mentioned above includes the problem of deposition of carbonaceous materials on the refractory surfaces of coke furnaces.

Coke furnaces produce coke by carbonization of coal at about 1,100° C. for 20–25 hours. Tarry materials and hydrocarbon gases are produced during the process of carbonization of coal. Such products penetrate into cracks in the inner walls, furnace lids, coal inlets, etc. of coke furnaces or into the open gas-pockets of the refractories constructing the furnaces, and are thermally carbonized to form highly adhesive carbon deposits.

The carbon deposits lower the melting points of the refractories, and also cause the refractories to become brittle. In addition, the furnace lids become more difficult to open and close as the carbon deposits accumulate, resulting in poorer sealing of the coke furnaces with the furnace lids. Mechanical removal o f the deposited carbon, which is frequently carried out to prevent the problem, however, takes much time due to the strong adhesion, and further the work environment is harsh. In addition, the surfaces of the refractories themselves are sometimes removed away during the process of removal. An alternative method by which air or oxygen gas is blown to burn off the carbon, however, can be applied to only the neighborhood of the furnace inlets. In order to clean all areas of the furnaces, the furnaces must be stopped temporarily and emptied out to burn off the carbon. However, the burning-off itself is a rigorous high-temperature operation, and the combustion heat generated during the burn-off process creates local hot spots of the refractories of the furnaces which may damage the furnaces.

In view of the circumstances, a variety of studies have been carried out on carbon adhesion-proof refractories and methods of protecting the refractory surfaces by coating with films.

Representative examples include:

1) Japanese Examined Patent Application Publication SHO 62-19477: application of a composition comprising silicon carbide, silicon nitride or graphite particles and an inorganic binder to the lining bricks of coke furnaces;

2) Japanese Unexamined Patent Application Disclosure SHO 62-197371: application of an agent which imparts properties of resisting heat and preventing the penetration of tarry materials, and comprises silicon carbide, silicon nitride, etc., a binder comprising a phosphate, yttrium oxide, etc. and a thermal insulating property-imparting agent comprising potassium titanate fibers to the inner wall surfaces of coke furnaces;

3) Japanese Examined Patent Application Publication SHO 63-40463: application of graphite powder and an inorganic binder such as colloidal silica and alumina sol to the lining refractories for the doors of coke furnaces; and 4) Japanese Unexamined Patent Application Disclosure SHO 63-236783: concurrent firing of a glazing agent and bricks for preparation of refractory bricks with glazing layers formed thereon, for the construction of coke furnaces;

Of the methods mentioned above, Methods 1) through 3) which use silicon carbide, silicon nitride, graphite and so on suffer from poor compatibility between the particles of these materials and the binders, and this produces the problem of peel-off of the coating layers during operation of the furnaces due to insufficient bonding strength.

Method 4) which uses bricks with glazing layers formed thereon provides satisfactory adhesion which does not allow the glazing layers to peel off while the furnaces are in use. The method is very effective also in that few gas-pockets are present in the glazing coats, and thus no carbon penetrates. This method, though applicable to the manufacture of new coke furnaces, furnace lids, etc., cannot be applied to running furnaces while hot in order to form glazing layers on the refractory surfaces of the furnaces.

It is a first object of the invention, which has been accomplished in view of the problems mentioned above, to provide a method of hot-applying a glazing agent to the surfaces of bricks, joints and monolithic refractories which form the inner wall surfaces of high-temperature furnaces, to form glazing layers thereon by melting the glazing agent.

It is a second object of the invention to provide a method of applying a glazing agent to the inner wall surfaces of furnaces such as coke furnaces and melting the glaze to form dense, durable, high-performance coats on the refractory wall surfaces which prevent the deposition of carbon and facilitate peel-off of any carbon deposits to prolong the lives of the furnaces.

DISCLOSURE OF THE INVENTION

A characteristic aspect of the present invention resides in the provision of a glazing agent comprising a combination of certain metal oxides which once melts to form glazing layers at the operation temperatures of furnaces or below when applied to the inner wall surfaces of the furnaces, with the melting point of the glaze gradually increasing after application, to hold the glazing layers.

The objects of the invention mentioned above are accomplished, since the glazing layers once formed on the inner refractory surfaces of furnaces by melting are firm glazing layers which neither melt nor are softened even while the furnaces are in use, and prevent the deposition of carbon thereon, or allow the carbon deposits to easily peel off.

The invention provides a glazing agent for forming a glazing layer which is hot-applied to furnace refractories or which prevents the deposition of carbon on the furnace refractories, characterized by comprising as a glaze of the glazing layer, on an oxide basis, 0–10% by weight of $Li_2O$, 0–10% by weight of $B_2O_3$, 10–40% by weight of $R_2O$ (R represents Na or K) and $SiO_2$ as the balance, wherein the glaze has a melting point of 900° C. or below.

The invention also provides an improved glazing a gent for forming a glazing layer which is hot-applied to furnace refractories or which prevents the deposition of carbon on the furnace refractories, characterized by comprising 100 parts or less by weight of a thermal expansivity modifier added to 100 parts by weight of a glazing agent which comprises as a glaze of the glazing layer, on an oxide basis, 0–10% by weight of $Li_2O$, 0–10% by weight of $B_2O_3$, 10–40% by weight of $R_2O$ (R is as previously defined) and $SiO_2$ as the balance, wherein the glaze has a melting point of 900° C. or below.

The invention also provides a glazing layer which is hot-applied to furnace refractories or which prevents the deposition of carbon on the furnace refractories, characterized by being formed by applying to the surface of a refractory, a glazing agent comprising as a glaze of the glazing layer, on an oxide basis, 0–10% by weight of $Li_2O$, 0–10% by weight of $B_2O_3$, 10–40% by weight of $R_2O$ (R is as previously defined) and $SiO_2$ as the balance, wherein the glaze has a melting point of 900° C. or below.

The invention also provides a glazing agent which is hot-applied to furnace refractories or which prevents the deposition of carbon the furnace refractories, characterized by comprising one or more compounds which form $SiO_2$, a component of the composition of a glaze forming a glazing layer, selected from the group consisting of sodium silicate, potassium silicate and lithium silicate, in addition to an alkali siliconate.

The invention also provides a method of forming a glazing layer which prevents the deposition of carbon on inner wall surfaces of a furnace, the method comprising the steps of: hot-applying to the inner wall surfaces, a glazing agent comprising as a glaze of the glazing layer on an oxide basis, 0–10% by weight of $Li_2O$, 0–10% by weight of $B_2O_3$, 10–40% by weight of $R_2O$ (R represents Na or K) and $SiO_2$ as the balance, wherein the glaze has a melting point of 900° C. or below, or applying the glazing agent to the inner wall surfaces while at a low temperature, followed by heating; and forming the glazing layer on the inner wall surfaces by melting.

The present invention also provides a glazing agent for forming a glazing layer which is hot-applied to furnace refractories or which prevents the deposition of carbon on the furnace refractories, and is characterized by comprising as a glaze of the glazing layer, on an oxide basis, $R_2O$ (R represents Na or K) and $SiO_2$, wherein the glaze has a melting point of 900° C. or below.

The present invention also provides a method of forming a glazing layer which prevents the deposition of carbon on inner wall surfaces of a furnace, the method comprising the steps of: hot-applying to the inner wall surfaces, a glazing agent comprising as a glaze of the glazing layer on an oxide basis, $R_2O$ wherein R represents Na or K, and $SiO_2$, wherein the glaze has a melting point of 900° C. or below, or applying the glazing agent to the inner wall surfaces while at a low temperature, followed by heating; and forming the glazing layer on the inner wall surfaces by melting.

The present inventors have tested a variety of combinations of metal oxides for their suitability as glazing agents, with particular attention focused on their melting behaviors at high temperatures (near the operation temperatures of coke furnaces, etc.). As a result, the composition according to the invention has been found as an optimum combination, and further the composition has been improved in terms of thermal expansivity to provide a glazing agent which may be applied to the inner wall surfaces of furnaces, thus completing the invention.

The invention will now be described in more detail.

Throughout the specification, the description is made with particular reference to only coke furnaces as the specific embodiments of "furnaces", which are, however, mere examples, and this never implies that the use of the glazing agent according to the invention is limited to coke furnaces only. The glazing agent according to the invention may be applied to damaged refractories inside furnaces or refractories on which carbon may deposit, particularly to the inner wall surfaces of furnaces (coke furnaces and carbon-firing furnaces), and devices attached to furnace (furnace lids and gas pipes).

Throughout the specification, "glazing agent" refers to fired glaze in some cases, or glazing composition prior to application (a so-called premix) in some cases. The fired glaze is one which contains the above oxides within the range defined above as the components. The glazing composition is the composition the ingredient contents of which have been adjusted so that the applied glaze forming a glazing layer contains the above oxides within the ranges defined above. Therefore, the glazing composition does not need to contain all the oxides mentioned above prior to application, and may instead contain metal salts or metal compounds which may be converted into the respective oxides after application.

In any case, the glazing agent is characterized by comprising $R_2O$ ($Na_2O$ or $K_2O$) and $SiO_2$ as the basic ingredients, preferably with $Li_2O$ and/or $B_2O_3$ incorporated therein.

Here, $R_2O$ represents either $Na_2O$ or $K_2O$, or a mixture of both.

Appropriate precursors which can be converted into the oxides mentioned above include hydroxides, carbonates, nitrates, phosphates, sulfates, chlorides, etc. of the same metals as those listed above. The precursors may be any which can be converted into their oxides at a temperature of 600° C. or higher.

The precursors of $Li_2O$ preferably are lithium hydroxide, lithium carbonate, lithium bicarbonate, lithium nitrate, lithium phosphate, lithium sulfate, lithium chloride, lithium silicate, etc.

The precursors of $Na_2O$ preferably are sodium hydroxide, sodium carbonate, sodium bicarbonate, sodium nitrate, sodium phosphate, sodium sulfate, sodium chloride, sodium silicate, etc.

The precursors of $K_2O$ preferably are potassium hydroxide, potassium carbonate, potassium bicarbonate, potassium nitrate, potassium phosphate, potassium sulfate, potassium chloride, potassium silicate, etc.

The precursors of $B_2O_3$ preferably are boric acid, sodium borate, potassium borate, etc.

The precursors of $SiO_2$ preferably are sodium silicate, potassium silicate, lithium silicate, silica sol and water-soluble alkali methylsiliconate.

The alkali siliconate includes sodium siliconate, potassium siliconate, lithium siliconate, etc. Of these, sodium methyl siliconate is particularly preferred since it is presently mass-produced and thus is inexpensive. In addition, sodium methylsiliconate is preferably used in a proportion of 2–30% by weight on the basis of $CH_3SiO_{1.5}$.

The use of an alkali siliconate in combination with sodium silicate, potassium silicate, lithium silicate or the like allows, when hot-applied to vertical wall surfaces, formation of uniform glazing layers which resist dripping, and thus are particularly suitable for such use. The preferred amount of addition thereof ranges from 2% by weight to 30% by weight of the composition; smaller amounts result in lower effectiveness, whereas larger amounts inadvantageously result in increased costs and poorer adhesion.

The alkali siliconate decomposes into $SiO_2$ after application, wherein organic groups such as methyl group as a decomposition product are burnt off.

The glazing agent according to the invention may be applied to the refractory surfaces constructing the inner wall surfaces of coke furnaces by any of the standard coating methods, including application (brush coating, troweling) of the glazing composition to predetermined surfaces and spraying. Accordingly, in order to achieve uniform application, it is desired to provide the composition as an aqueous solution or as a slurry which is nearly an aqueous solution. Most of the metal salts and metal compounds mentioned above are prepared as aqueous solutions so that the metal composition ratio may be easily adjusted as desired, in the aqueous solutions. However, even the water-insoluble or sparingly-soluble metal salts and metal compounds may be used as slurries by dispersing them in water. Both the water-soluble and water-insoluble precursors may of course be used in admixture.

The solid content of the aqueous solution to be applied is usually adjusted to about 5–50% by weight, preferably to about 10–40% by weight, on a metal oxide basis. In about where the content increases to about 50% by weight or more, the solution tends to gel to clog the spray nozzle when heated at the time of application. On the other hand, when the content is about 5% by weight or less, the application efficiency decreases because a composition in the form of an aqueous solution must be used in a larger amount to form a satisfactory coat. The thickness of the coat (that is, glazing layer) is not particularly limited, and thicknesses of 3 mm or less are practically acceptable.

A characteristic aspect of the glazing agent according to the invention resides in that the glazing agent once melts, when applied to the inner wall surfaces of furnaces, to form a coat of uniform, dense, glassy glazing layers on their refractory surfaces at or near the operation temperatures of the furnaces or below, and that the melting point of the glazing layers gradually increases with time after application so that the glazing layers do not melt again at the operation temperatures of the furnaces, thereby hold the firm coats.

The melting point of the glazing agent according to the invention must be lower than the operation temperatures of furnaces, and should be set to about 900° C. or lower, with consideration given to the effect on the perimeter of the refractories constructing the inner walls of furnaces. It is also an embodiment of the invention to appropriately adjust the ratio of the ingredients of the composition so that the melting point of the glaze is equal to or lower than the target value. Specifically, in the case of an $Li_2O$—$Na_2O$—$SiO_2$ ternary system, for example, the weight percents of the respective ingredients are determined in an appropriate area in the phase diagram (see F. C. Kracek, J. Am. Chem. Soc., 61, 2871 (1939), for example) where melting points are 900° C. or lower, and precursors of $Li_2O$, $Na_2O$ and $SiO_2$ are mixed in such prescribed amounts as to provide a desired component ratio to produce a glazing agent according to the invention.

The melting point of the applied glazing agent according to the invention increases because part of the ingredients of the composition are thought to vaporize or diffuse over time. The mechanism, which does not limit the invention in any way, presumably involves a significant decrease in melting point (1,728° C. when only $SiO_2$ is present) when $Li_2O$ or $R_2O$, for example, is co-present with $SiO_2$. These alkali metal oxides, having relatively large diffusion coefficients and relatively high vapor pressures, diffuse and vaporize over time after application, and eventually the composition of the glazing layer approaches that of a $SiO_2$ film, thus increasing the melting point. Since $B_2O_3$ easily vaporizes to decrease the melting point as well, it may be used in combination with $SiO_2$ likewise $Li_2O$ and $R_2O$.

According to the invention, the glazing composition preferably comprises as the glaze, on an oxide basis, 0 to about 10% by weight of $Li_2O$, 0 to about 10% by weight of $B_2O_3$, about 10–40% by weight of $R_2O$ and $SiO_2$ as the balance; more preferably, the $Li_2O$ content ranges from 0.2 to about 10% by weight, and/or the $B_2O_3$ content from 0.5 to about 10% by weight.

Therefore, a first preferred glazing composition according to the invention comprises about 10–40% by weight of $R_2O$ and $SiO_2$ as the balance.

A second preferred glazing composition according to the invention comprises about 0.2–10% by weight of $Li_2O$, about 10–40% by weight of $R_2O$ and $SiO_2$ as the balance.

A third preferred glazing composition according to the invention comprises about 0.5–10% by weight of $B_2O_3$, about 10–40% by weight of $R_2O$ and $SiO_2$ as the balance.

A fourth preferred glazing composition according to the invention comprises about 0.2–10% by weight of $Li_2O$, about 0.5–10% by weight of $B_2O_3$, about 10–40% by weight of $R_2O$ and $SiO_2$ as the balance.

The presence of the respective ingredients in proportions outside the ranges mentioned above in the glazing agent should be avoided, since the melting point increases, or the film-forming properties are impaired when used for coating.

A variety of glazing agents known in the prior art are not composed with due consideration to their melting points; therefore, they cause the applied glazing layers to melt and run, thereby exposing the refractories, or to change from a glass state into a starch-like syrup, thereby facilitating the deposition of carbon. In addition, the glazing layer may be scraped off by the carbon particles in some cases, with unsatisfactory results.

The invention includes an improved glazing agent characterized by being prepared by the addition of a suitable thermal expansivity modifier to the glazing agent described above. Since the inner temperatures of running coke furnaces sometimes fluctuate, large differences in thermal expansivity between the refractories and the glazing layers often cause cracking in the glazing layers, and thus impair the function of the coats to prevent the deposition of carbon. Accordingly, in order to improve the compatibility between the glazing layers and the refractories, the thermal expansivity modifier added should be the same type as that of the refractories; one or more selected from the group consisting of $Al_2O_3$, MgO, CaO, $ZrO_2$ and $TiO_2$ may be used with particularly satisfactory results. The thermal expansivity modifier is used in a proportion of about 100% by weight or less per 100 parts by weight of the glazing agent. This proportion is preferred, since the thermal expansivity modifier integrates uniformly in the applied glazing agent to form satisfactory coats as glazing layers when used at the proportion.

A thermal expansivity modifier (usually solid powder) is added to the glazing composition according to the invention prior to application, to prepare a slurry which is then applied to the surfaces of refractories in a conventional manner, as is the case with the composition with no such agent added.

Since thermal expansivity modifiers generally have high melting points, the melting point of the composition increases if the agent rapidly integrates throughout the composition, and this makes it difficult to form a glazing layer as the coat at a temperature of 900° C. or lower. Actually, however, thermal expansivity modifiers have low self-diffusion coefficients due to their high melting points. Therefore, in cases where a thermal expansivity modifier is added as solid powder, the portions of the composition other than the solid powder first melt to form a glazing layer as a coat with the solid powder enveloped therein. The ingredients of the solid powder then diffuse to provide the coat with an integrated structure as a whole, thus producing a glazing layer with an adjusted thermal expansivity. Use of this improved glazing agent minimizes the peel-off of the glazing layer, and further enhances the effect of preventing the deposition of carbon.

In the invention, although there is no particular limit to the particle sizes of the constituent particles of the glazing composition, too large particle sizes make application difficult, whereas too small particle sizes cause cracking in the applied coats due to increased shrinkage. Accordingly, the range on the order of 0.5–5 μm is preferred from a practical point of view.

When the invention is carried out, the inner wall surfaces of coke furnaces are coated with the glazing composition according to the method described above. The composition may be applied while the furnaces are still hot, or applied when the furnaces are at low temperatures, followed by heating; the former method is preferred, since the operation of the furnaces need not be suspended. The coats are dried, melted and fired to form glazing layers by the heat inside the running furnaces. The dense, high-performance glazing layers formed in this way have excellent compatibility with the refractory surfaces, as described above, and continue to prevent the deposition of carbon, without being peeled off while the furnaces are in use. Accordingly, the method of applying the glazing agent to prevent the deposition of carbon, the method of forming the glazing layer and the applied glazing layer itself constitute part of the invention.

BEST MODE FOR CARRYING OUT THE INVENTION

The present invention will now be described in more detail with reference to the examples, without being limited thereto. In the examples, % is % by weight in all the cases.

EXAMPLE 1

A hundred parts by weight of No. 3 soluble glass ($Na_2O$, 8.7%; $SiO_2$, 27.8%; water, 63.5%) and 50 parts by weight of lithium silicate ($Li_2O$, 2.2%; $SiO_2$, 20%) were mixed and stirred to give a completely transparent solution. The solution is referred to as Solution A.

Ninety-six parts by weight of lithium hydroxide (LiOH) was added to and dissolved in 959 parts by weight of water. Subsequently, 318 parts by weight of boric acid ($H_3BO_3$) powder was added to the resulting solution which was then stirred to give a completely transparent solution. The solution is referred to as Solution B.

Twelve point five parts by weight of Solution B was added to 100 parts by weight of sodium methylsiliconate ($Na_2O$, 10.7%; $CH_3SiO_{1.5}$, 20% (17.9% on the basis of $SiO_2$)), and the mixture was stirred to give a transparent solution. The solution is referred to as Solution C.

Thirty parts by weight of Solution C was added to 100 parts by weight of Solution A, and the mixture was stirred to give a transparent solution. The solution is referred to as Solution D.

The effect of the preparation remained unchanged even when heating was applied at 70–80° C. to increase the reaction rate.

The resulting glazing composition contained the ingredients which would have been converted to the following oxides of the glaze: $Na_2O$, 21.7%; $Li_2O$, 2.2%; $B_2O_3$, 1.1%; and $SiO_2$, 75.0%. A 100 ×100×40-mm piece was cut from a commercially available castable brick which contained 36% of $SiO_2$ and 54% of $Al_2O_3$, to prepare a test refractory specimen.

The specimen was placed and heated in an furnace at 900° C. After it was confirmed that the temperature of the specimen had increased to 900° C., the specimen was taken out, and the surface of the specimen was immediately sprayed with Solution D using a spray gun. The specimen, though bubbled at the beginning, melted in about one minute to form a uniform, firm glassy coat. The specimen was again placed in the furnace at 900° C. and held for 2 hours therein.

A slurry consisting of 5 parts of coal powder and 3 parts of coal tar was applied onto the specimen coated with the glazing layer formed in this way, and the specimen was heated at 800° C. for 3 hours under an inert atmosphere (for example, under nitrogen). After having been cooled, the specimen was evaluated for ease of peeling off the deposited carbon using an adhesive tape; the carbon peeled off easily.

On the other hand, specimens with no glazing composition according to the invention applied thereto had firm carbon deposits on the surfaces thereof, which could not be completely removed even with a mechanical force.

EXAMPLE 2

A hundred parts by weight of No. 3 soluble glass ($Na_2O$, 9.6%; $SiO_2$, 27.8%; water, 62.6%) and 4.4 parts by weight of lithium silicate ($Li_2O$, 2.2%; $SiO_2$, 20%; water, 77.8%) were mixed and stirred to give a completely transparent solution. The solution is referred as Solution A'.

Ten point one parts by weight of water was added to 100 parts by weight of Solution A', followed by the addition of 2.7 parts by weight of a solution of the same composition as that of Solution B prepared in Example 1 and then 10.5% sodium methylsiliconate ($Na_2O$, 10.7%; $CH_3SiO_{1.5}$, 20.0% (17.9% on the basis of $SiO_2$)), and the mixture was stirred to give a transparent solution. The solution is referred to as Solution D'.

The resulting glazing composition contained the ingredients which would have been converted to the following oxides of the glaze: $Na_2O$, 25.8%; $Li_2O$, 0.4%; $B_2O_3$, 1.0%; and $SiO_2$, 72.8%.

The composition was as follows until the methyl group of the sodium methylsiliconate was burnt off: $SiO_2$, 67.8%; $Li_2O$, 0.4%; $Na_2O$, 25.6%; $B_2O_3$, 1.0%; and $CH_3SiO_{1.5}$, 5.2%.

A test refractory specimen was prepared in the same manner as in Example 1.

The specimen was placed and heated in an furnace at 900° C. After it was confirmed that the temperature of the specimen had increased to 900° C., the specimen was taken out, and the surface of the specimen was immediately sprayed with Solution D' using a spray gun. The specimen, though bubbled at the beginning, melted in about one minute to form a uniform, firm glassy coat.

In addition, Solution E was prepared which had almost the same composition as Solution D, except that the content of sodium methylsiliconate was reduced to a fifth the content of Solution D'.

Solution E prepared as a glazing agent as described above contained the ingredients which would have been converted to the following oxides of the glaze: $Na_2O$, 25.0%; $Li_2O$, 0.5%; $B_2O_3$, 1.1%; and $SiO_2$, 73.5%.

The composition was as follows until the methyl group of the sodium methylsiliconate was burnt off: $SiO_2$, 72.4%; $Li_2O$, 0.5%; $Na_2O$, 24.9%; $B_2O_3$, 1.3%; and $CH_3SiO_{1.5}$, 1.1%.

The specimen was tested in the same manner as in Example 1, with the result that although a uniform and firm glassy coat was formed, a considerable amount of drips were observed when applied to the vertical surface of the specimen.

EXAMPLES 3–6

Glazing compositions were prepared in the same manner as in Example 1 so as to have the compositions listed in Table 1, and the resulting glazing layers were evaluated for the properties of forming coats and ease of peeling off the deposited carbon. The compositions and the results of evaluation are listed in Table 1, respectively.

EXAMPLE 7

One hundred parts by weight of Solution D, a glazing composition prepared in Example 1, and 20 parts by weight of alumina powder having an average particle size up to 5 μm were mixed to provide a slurry of the improved glazing composition.

A brick specimen was sprayed with the slurry in the same manner as in Example 1. The formed coat, though being not transparent, had a glossy glassy surface.

Comparative Examples 1–2

Glazing compositions were prepared in the same manner as in Example 1 so as to have the compositions listed in Table 1, and the resulting glazing layers were evaluated. The compositions and the results of evaluation are listed in Table 1, respectively.

TABLE 1

|  | Ex. 3 | Ex. 4 | Ex. 5 | Ex. 6 | Comp. Ex. 1 | Comp. Ex. 2 |
| --- | --- | --- | --- | --- | --- | --- |
| $Na_2O$ | 20% | 20% | 5% | 5% | 20% | 22% |
| $K_2O$ | — | — | 23 | 25 | — | — |
| $Li_2O$ | 5 | 5 | 2 | — | 20 | — |
| $B_2O_3$ | — | 3 | 1 | — | — | — |
| $SiO_2$ | 75 | 72 | 69 | 70 | 60 | 78 |
| M. P. | <700° C. | <700° C. | <700° C. | <600° C. | >1000° C. | >1000° C. |
| Coating with glazing coat | ○ | ○ | ○ | ○ | × | × |
| Carbon deposition | ○ | ○ | ○ | ○ | — | — |

Explanation of the symbols in the table:
Coating with glazing layer: ○ , uniform glassy coat; ×, bubbling, no coat formed.
Carbon deposition: ○ , deposited carbon easily peeled off.

The melting points were estimated through visual observation on whether the glazing agents melted to form glazing layers when thermally treated at 600° C., 700° C., 800° C., 900° C. and 1,000° C., respectively.

The test results reported in Table 1 clearly show that the glazing layers according to the Examples had excellent coat-forming properties and the effect of significantly preventing the deposition of carbon, whereas the glazing agents according to the Comparative Examples were inferior to the Examples in both the properties and effect.

High-temperature Holding Test

A brick coated with the glazing layer which was produced as described in Example 1 was held at 900° C. for about 5 hours, and the components of the glazing layer coating the fired brick were analyzed and found to have an $SiO_2/Na_2O$ molar ratio of 3.5; comparison with the original value of 3.0 proves that $Na_2O$ has reduced.

When the brick was held at 1,100° C. for an additional one hour, the molar ratio increased to 7.5, and this demonstrates a significant reduction in the $Na_2O$ content. Here, no $B_2O_3$ or $Li_2O$ was detected. Since the melting point of the glazing layer was 1,300° C. or higher, the effect of significantly increasing the original melting point of 800° C. or lower was confirmed.

Industrial Applicability

By applying the glazing agent according to the invention to the inner wall surfaces of furnaces such as coke furnaces, dense, durable, high-performance coats are formed which significantly prevent the deposition of carbon to prolong the lives of the furnaces. Also, hot-application of the glazing agent according to the invention to such portions as bricks, monolithic refractories and joints which construct the wall surfaces of high-temperature furnaces results in the formation of dense, durable, high-performance glazing layers thereon which prevent the deposition of dust on the refractory surfaces, and allow the damaged portions to be repaired, and this serves to prolong the lives of the furnaces as well. Since the glazing agent according to the invention is simple and easy to apply without interrupting the normal operation of the furnaces, it is effective in terms of labor, materials and cost, and thus the invention has excellent industrial applicability.

What is claimed is:

1. A glazing agent for forming a glazing layer which is hot-applied to furnace refractories or which prevents the deposition of carbon on the furnace refractories, the glazing agent consisting essentially of 100 parts or less by weight of a thermal expansively modifier added to 100 parts by weight of a glazing agent which consists essentially of as a glaze of the glazing layer, on an oxide basis, 0–10% by weight of $Li_2O$, 0–10% by weight of $B_2O_3$, 10–40% by weight of $R_2O$ wherein R represents Na or K, and $SiO_2$ as the balance, wherein the glaze has a melting point of 900° C. or below.

2. The glazing agent according to claim 1, wherein the thermal expansivity modifier is selected from the group consisting of $Al_2O_3$, MgO, CaO, $ZrO_2$ and $TiO_2$.

3. The combination of a glazing agent according to claim 1 and furnace refractories which are selected from the group consisting of bricks, joints and monolithic refractories.

4. A glazing agent for forming a glazing layer which is hot-applied to furnace refractories or which prevents the deposition of carbon on the furnace refractories, the glazing agent comprising as a glaze of the glazing layer, on an oxide basis, 0–10% by weight of $Li_2O$, 0–10% by weight of $B_2O_3$, 10–40% by weight of $R_2O$ wherein R represents Na or K, and $SiO_2$ as the balance, wherein the glaze has a melting point of 900° C. or below, and a compound which forms $SiO_2$ comprises one or more selected from the group consisting of sodium silicate, potassium silicate and lithium silicate, in addition to an alkali siliconate.

5. The glazing agent according to claim 4, wherein the alkali siliconate is sodium methylsiliconate which composes 2–30% by weight of the glazing agent, on the basis of $CH_3SiO_{1.5}$.

6. The combination of a glazing agent according to claim 4 and furnace refractories which are selected from the group consisting of bricks, joints and monolithic refractories.

7. A method of forming a glazing layer which prevents the deposition of carbon on inner wall surfaces of a furnace, the method comprising the steps of:

hot-applying to the inner wall surfaces, a glazing agent comprising as a glaze of the glazing layer, on an oxide basis, 0–10% by weight of $Li_2O$, 0–10% by weight of $B_2O_3$, 10–40% by weight of $R_2O$ wherein R represents Na or K, and $SiO_2$ as the balance, wherein the glaze has a melting point of 900° C. or below, or applying the glazing agent to the inner wall surfaces while at a temperature 500° C. or below, followed by heating; and forming the glazing layer on the inner wall surfaces by melting.

8. A glazing agent for forming a glazing layer which is hot-applied to furnace refractories or which prevents the deposition of carbon on the furnace refractories, the glazing agent consisting essentially of as a glaze of the glazing layer, on an oxide basis, 10–40% by weight of $R_2O$ wherein R represents Na or K, and $SiO_2$ as the balance, wherein the glaze has a melting point of 900° C. or below.

9. The combination of a glazing agent according to claim 8 and furnace refractories which are selected from the group consisting of bricks, joints and monolithic refractories.

10. A method of forming a glazing layer which prevents the deposition of carbon on inner wall surfaces of a furnace, the method comprising the steps of: hot-applying to the inner wall surfaces, a glazing agent comprising as a glaze of the glazing layer on an oxide basis, 10–40% by weight of $R_2O$ wherein R represents Na or K, and $SiO_2$ as the balance, wherein the glaze has a melting point of 900° C. or below, or applying the glazing agent to the inner wall surfaces while at a low temperature, followed by heating; and forming the glazing layer on the inner wall surfaces by melting.

11. A glazing agent for forming a glazing layer which is hot-applied to furnace refractories or which prevents the deposition of carbon on the furnace refractories, the glazing agent comprises 100 parts or less by weight of a thermal expansively modifier added to 100 parts by weight of a glazing agent which comprises as a glaze of the glazing layer, on an oxide basis, 0.2–10% by weight of $Li_2O$, 0–10% by weight of $B_2O_3$, 10–40% by weight of $R_2O$ wherein R represents Na or K, and $SiO_2$ as the balance, wherein the glaze has a melting point of 900° C. or below.

12. The glazing agent according to claim 11, wherein 0.5–10% by weight of $B_2O_3$ is contained.

13. A glazing agent for forming a glazing layer which is hot-applied to furnace refractories or which prevents the deposition of carbon on the furnace refractories, the glazing agent comprises 100 parts or less by weight of a thermal expansively modifier added to 100 parts by weight of a glazing agent which comprises as a glaze of the glazing layer, on an oxide basis, 0–10% by weight of $Li_2O$, 0–10% by weight of $B_2O_3$, 10–40% by weight of $R_2O$ wherein R represents Na or K, and $SiO_2$ as the balance, wherein the glaze has a melting point of 900° C. or below, and a compound which forms $SiO_2$ comprises one or more selected from the group consisting of sodium silicate, potassium silicate and lithium silicate, in addition to an alkali siliconate.

14. The glazing agent according to claim 13, wherein the alkali siliconate is sodium methylsiliconate which composes 2–30% by weight of the glazing agent, on the basis of $CH_3SiO_{1.5}$.

15. A glazing agent for forming a glazing layer which is hot-applied to furnace refractories or which prevents the deposition of carbon on the furnace refractories the glazing agent comprising as a glaze of the glazing layer, on an oxide basis, 10–40% by weight of $R_2O$, wherein R represents Na or K and $SiO_2$ as the balance, the glaze has a melting point of 900° C. or below, and a compound which forms $SiO_2$ comprises one or more selected from the group consisting of sodium silicate, potassium silicate and lithium silicate, in addition to an alkali siliconate.

16. The glazing agent according to claim 15, wherein the alkali siliconate is sodium methylsiliconate which composes 2–30% by weight of the glazing agent, on the basis of $CH_3SiO_{1.5}$.

17. A glazing agent for forming a glazing layer which is hot applied to furnace refractories or which prevents the deposition of carbon on the furnace refractories, the glazing agent comprising as a glaze of the glazing layer, on an oxide basis, 10–40% by weight of $R_2O$, wherein R represents Na or K and $SiO_2$ as the balance, the glaze has a melting point of 900° C. or below, and a compound which forms $R_2O$ comprises one or more selected from the group consisting of sodium hydroxide, sodium carbonate, sodium bicarbonate, sodium nitrate, sodium phosphate, sodium sulfate, sodium chloride, sodium silicate, potassium hydroxide, potassium carbonate, potassium bicarbonate, potassium nitrate, potassium phosphate, potassium sulfate, potassium chloride and potassium silicate.

* * * * *